United States Patent Office 3,448,115
Patented June 3, 1969

3,448,115
2-TRI- (MIXED) HALOMETHYL BENZIMIDAZOLES
George Holan, Brighton, Victoria, and Eva L. Samuel, Bentleigh, Victoria, Australia, assignors to Monsanto Chemicals (Australia) Limited, West Footscray, Victoria, Australia, a company of Victoria, Australia
No Drawing. Filed Dec. 19, 1966, Ser. No. 602,599
Claims priority, application Australia, Dec. 29, 1965, 68,371/65
Int. Cl. C07d 49/38
U.S. Cl. 260—309.2      9 Claims

ABSTRACT OF THE DISCLOSURE

Monofluorodichloromethylbenzimidazoles and monochlorodifluoromethylbenzimidazoles having utility as herbicides and intermediates for anthelmintic compounds.

---

This invention relates to 2-substituted benzimidazoles which are useful per se as biological toxicants, e.g., herbicides and anthelmintics, and as intermediates for the preparation of various compounds including other 2-substituted benzimidazoles which also have valuable biological properties, particularly as anthelmintics.

The novel 2-trihalomethyl benzimidazoles of this invention are represented by the formula:

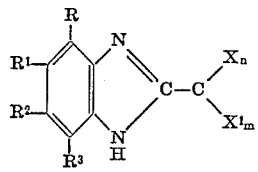

wherein R, $R^1$, $R^2$ and $R^3$ are each selected from the group consisting of hydrogen, halogen (Cl, Br, R and I), OH, $NO_2$, $NH_2$, alkyl, alkoxy, haloalkyl, alkylthio, alkylamino, dialkylamino, acylamino and acyloxy X is Cl, $X^1$ is F, $n$ is an integer from 1 to 2, $m$ is an integer from 1 to 2 and the sum of $n+m$ is 3.

In the above formula the alkyl and each alkyl portion of the alkoxy, haloalkyl, alkylthio, alkylamino, dialkylamino, acylamino and acyloxy of R, $R^1$, $R^2$ and $R^3$ are of not more than 12 carbon atoms, and preferably of not more than 4 carbon atoms. The haloalkyl contains from 1 to 5 halogen atoms (Cl, Br, F and I) and is preferably a chloroalkyl. The preferred compounds of the above formula are those wherein R and $R^3$ or R, $R^2$ and $R^3$ are hydrogen.

The 2-trihalomethyl benzimidazoles of this invention are prepared by a process which comprises reacting an appropriate o-phenylenediamine with monochlorodifluoroacetic acid or monofluorodichloroacetic acid. The reaction can be carried out by simply admixing the two reactants, preferably at a temperature above about 20° C. However the reaction is advantageously carried out in the presence of an aqueous medium which optionally contains a small amount of mineral acid such as hydrochloric acid. The reaction product can be isolated by the addition of a base, such as 10% sodium carbonate solution, and purified by conventional procedures.

The following examples will illustrate the invention. In these examples, as well as in the specification and appended claims, parts and percent are by weight unless otherwise indicated.

EXAMPLE 1

2-monochlorodifluoromethylbenzimidazole is prepared by adding about 65 parts of 2-monochlorodifluoroacetic acid to about 54 parts of o-phenylenediamine in about 500 parts of 4 N hydrochloric acid. The reaction mixture is heated at reflux for about three hours. At the end of the reflux period the reaction mixture is cooled and neutralized with a 10% aqueous solution of sodium carbonate. The resulting precipitate is essentially pure 2-monochlorodifluoromethylbenzimidazole, M.P. 212° C.

Following the procedure of Example 1 above and using the appropriate reactants, the following compounds of this invention are prepared.

Examples:
| | |
|---|---|
| 2 | 2-monofluorodichloromethylbenzimidazole. |
| 3 | 2-monochlorodifluoromethyl-5-ethylbenzimidazole. |
| 4 | 2-monochlorodifluoromethyl-5-methylbenzimidazole. |
| 5 | 2-monochlorodifluoromethyl-5-butylbenzimidazole. |
| 6 | 2-monochlorodifluoromethyl-5-octylbenzimidazole. |
| 7 | 2-monochlorodifluoromethyl-4-methylbenzimidazole. |
| 8 | 2-monofluorodichloromethyl-5-methylbenzimidazole. |
| 9 | 2-monofluorodichloromethyl-5-propylbenzimidazole. |
| 10 | 2-monofluorodichloromethyl-5-hexylbenzimidazole. |
| 11 | 2-monochlorodifluoromethyl-5,6-dimethylbenzimidazole. |
| 12 | 2-monochlorodifluoromethyl-5,6-dibutylbenzimidazole. |
| 13 | 2-monofluorodichloromethyl-5,6-dimethylbenzimidazole. |
| 14 | 2-monofluorodichloromethyl-5,6-diethylbenzimidazole. |
| 15 | 2-monochlorodifluoromethyl-5-methoxybenzimidazole. |
| 16 | 2-monochlorodifluoromethyl-5-butoxybenzimidazole. |
| 17 | 2-monochlorodifluoromethyl-5-hexoxybenzimidazole. |
| 18 | 2-monofluorodichloromethyl-5-methoxybenzimidazole. |
| 19 | 2-monofluorodichloromethyl-5-ethoxybenzimidazole. |
| 20 | 2-monochlorodifluoromethyl-5-chlorobenzimidazole. |
| 21 | 2-monochlorodifluoromethyl-4-chlorobenzimidazole. |
| 22 | 2-monofluorodichloromethyl-5-chlorobenzimidazole. |
| 23 | 2-monochlorodifluoromethyl-5-bromobenzimidazole. |
| 24 | 2-monofluorodichloromethyl-5-bromobenzimidazole. |
| 25 | 2-monochlorodifluoromethyl-5,6-dichlorobenzimidazole. |
| 26 | 2-monochlorodifluoromethyl-5,6-dibromobenzimidazole. |
| 27 | 2-monofluorodichloromethyl-5,6-dichlorobenzimidazole. |
| 28 | 2-monofluorodichloromethyl-5,6-difluorobenzimidazole. |
| 29 | 2-monochlorodifluoromethyl-5-methylthiobenzimidazole. |
| 30 | 2-monochlorodifluoromethyl-5-butylthiobenzimidazole. |
| 31 | 2-monofluorodichloromethyl-5-methylthiobenzimidazole. |
| 32 | 2-monofluorodichloromethyl-5-ethylthiobenzimidazole. |

Examples:—Continued 33  2-monochlorodifluoromethyl-5-chloromethyl-benzimidazole.
34  2-monochlorodifluoromethyl-5-bromomethyl-benzimidazole.
35  2-monofluorodichloromethyl-5-chloromethyl-benzimidazole.
36  2-monofluorodichloromethyl-5-chlorobutyl-benzimidazole.
37  2-monochlorodifluoromethyl-5-nitrobenzimidazole.
38  2-monochlorodifluoromethyl-5,6-dinitrobenzimidazole.
39  2-monofluorodichloromethyl-5-nitrobenzimidazole.
40  2-monochlorodifluoromethyl-5-aminobenzimidazole.
41  2-monofluorodichloromethyl-5-aminobenzimidazole.
42  2-monofluorodichloromethyl-4-aminobenzimidazole.
43  2-monochlorodifluoromethyl-5-acetylaminobenzimidazole.
44  2-monochlorodifluoromethyl-5-propionylaminobenzimidazole.
45  2-monochlorodifluoromethyl-5-butyrylaminobenzimidazole.
46  2-monofluorodichloromethyl-5-acetylaminobenzimidazole.
47  2-monochlorodifluoromethyl-5-methylaminobenzimidazole.
48  2-monochlorodifluoromethyl-5-butylaminobenzimidazole.
49  2-monofluorodichloromethyl-5-methylaminobenzimidazole.
50  2-monofluorodichloromethyl-5-ethylaminobenzimidazole.
51  2-monochlorodifluoromethyl-5-dimethylaminobenzimidazole.
52  2-monochlorodifluoromethyl-5-dibutylaminobenzimidazole.
53  2-monofluorodichloromethyl-5-dimethylaminobenzimidazole.
54  2-monofluorodichloromethyl-5-diethylaminobenzimidazole.
55  2-monofluorodichloromethyl-5-hydroxybenzimidazole.
56  2-monofluorodichloromethyl-4-hydroxybenzimidazole.
57  2-monofluorodichloromethyl-5-acetylaminobenzimidazole.
58  2-monofluorodichloromethyl-4,5,6,7-tetramethylbenzimidazole.
59  2-monofluorodichloromethyl-4,5,6,7-tetramethoxybenzimidazole.
60  2-monofluorodichloromethyl-4,5,6,7-tetrachlorobenzimidazole.

Unlike the 2-monochlorodifluoro- or 2-monofluorodichloro-acetic acids, the 2-trichloro- or 2-tribromo- or 2-monochlorodibromo- or 2-monobromodichloro-acetic acids cannot be reacted with o-phenylenediamines to produce equivalent 2-trihalomethylbenzimidazoles. 2-trifluoromethylbenzimidazoles can be prepared from o-phenylenediamines and trifluoroacetic acid, but they are incapable of further reaction to produce the 2-substituted benzimidazoles specified hereinafter. In accordance with this invention it has been found that the replacement of one or two of the fluorine atoms in the trifluoromethyl group of 2-trifluoromethylbenzimidazole with chlorine atoms results in remarkable and unexpected reactivity in relation to further cyclization reactions for the preparation of the 2-substituted benzimidazoles specified hereinafter.

Compounds in accordance with this invention thus are particularly useful as intermediates or starting materials for the preparation of a wide range of 2-substituted benzimidazoles having valuable technical applications. The trihalomethyl group in the compounds of the invention is activated by the adjacent benzimidazole ring, the fluorine and chlorine atoms being much more easily displaced by nucleophilic reagents than, for example, in benzotrichloride. The compounds of the invention are especially useful for the preparation of 2-azolin-2-yl-benzimidazoles having valuable biological toxicant activity, particularly as anthelmintics. The 2-azolin-2-yl-benzimidazoles or other derivatives which can be prepared from the compounds of this invention can be prepared from the reaction mass resulting from the preparation of the compounds of the invention, without isolation of such compounds. Alternatively, the compounds can be isolated for further reaction as indicated.

One example of 2-azolin-2-yl-benzimidazoles which can be prepared utilizing the new compounds of this invention are the 2-(2'-imidazolin-2'-yl)-benzimidazoles having the formula:

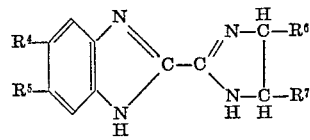

wherein $R^4$ and $R^5$ are hydrogen, halogen, alkyl containing 1 to 6 carbon atoms, or alkoxy containing 1 to 6 carbon atoms inclusive; and wherein $R^6$ and $R^7$ are hydrogen or alkyl radicals containing 1 to 6 carbon atoms inclusive. The halogen preferably is chlorine while the alkyl preferably is methyl, and the alkoxy preferably is methoxy. These compounds form salts and N-acyl derivatives, the N-acyl derivatives preferably being the N-acetyl or N-benzoyl derivative, which convert by hydrolysis to the parent base of the above formula. The salts are preferably the acid-addition salts, such as the hydrochloride, sulphate, and nitrate, provided by mineral acids; or such as the acetate, glycolate, and stearate, provided by aliphatic carboxylic acids; or such as the phthalate, p-aminobenzoate, and salicylate, provided by aromatic carboxylic acids. Certain of these salts, such as the hydrochloride and acetate, are more soluble in water than the parent base, hence they are more suitable for some applications. When applied as anthelmintics it is, of course, essential that the acid moiety of the present compounds be non-toxic, and for this purpose the salts with aromatic carboxylic acids are particularly preferred.

The 2-trihalomethyl benzimidazoles of the invention react with ethylene diamine or substituted ethylene diamines to give the indicated 2-imidazolin-2-yl derivatives in very high yield, as illustrated in the followng equaton:

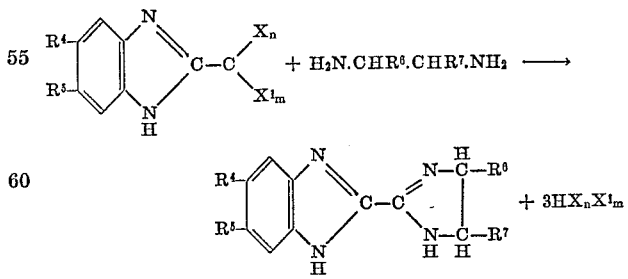

wherein $R^4$, $R^5$, $R^6$, $R^7$, X, $X^1$, $n$ and $m$ are as defined above. Thus, 2-monochlorodifluoromethylbenzimidazole reacts spontaneously on mixing with an excess of ethylene diamine at room temperature to give 2-(2'-imidazolin-2'-yl)-benzimidazole in quantitative yield. An inert diluent or solvent, such as 1,2-dimethoxyethane or ethyl acetate can be used to give a more easily controlled reaction. The order of mixing of reagents is not critical, which applies also to the molar proportion, however, an excess of the diamine is preferred since this then serves to neutralize the hydrogen halide formed in the reaction. The product is separated from solvent and the diamine hydrohalide by conventional methods.

Illustrative member compounds which may be so produced are 2-(2'-imidazolin-2'-yl)-benzimidazole; 2-(2'-imidazolin-2'-yl)-5,6-dimethylbenzimidazole; 2-(2'-imidazolin - 2'-yl)-5,6-dichlorobenzimidazole; 2-(2'-imidazolin-2' - yl)-5-chlorobenzimidazole; 2-(2'-imidazolin-2'-yl)-5-methylbenzimidazole; 2-(4'-methyl-2'-imidazolin-2'-yl)-5-methylbenzimidazole; and 2-(2'-imidazolin-2'-yl)-5,6-diethylbenzimidazole. Preparation of such compounds is illustrated in the following nonlimitative practical example:

Example

Ethylene diamine was added gradually with cooling to a solution of 2-monochlorodifluoromethylbenzimidazole in 1,2-dimethoxyethane. After 15 minutes, the solution was diluted with water giving 2-(2'-imidazolin-2'-yl)-benzimidazole as a pale buff solid. Recrystallization from aqueous acetone gave colorless needles, M.P. 280° C.

Another example of 2-azolin-2-yl-benzimidazoles which can be prepared utilizing the new compounds of the invention are the 2-(2'-oxazolin-2'-yl)-benzimidazoles having the structural formula:

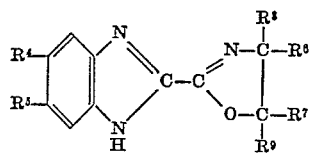

wherein $R^4$ and $R^5$ are selected from hydrogen, halogen, alkyl containing 1 to 6 carbon atoms, and alkoxy containing 1 to 6 carbon atoms; and $R^6$, $R^7$, $R^8$ and $R^9$ are selected from hydrogen and alkyl containing 1 to 6 carbon atoms. Illustrative of these compounds are 2-(2'-oxazolin-2'-yl)-benzimidazole; 2-(2'-oxazolin-2'-yl)-5,6-dimethylbenzimidazole; 2-(2'-oxazolin-2'-yl)-5-chlorobenzimidazole; 2-(2'-oxazolin-2'-yl)-5-methoxybenzimidazole; 2-(4'-methyl-2'-oxazolin-2'-yl)-benzimidazole; and 2-(4',4'-dimethyl-2'-oxazolin-2'-yl)-benzimidazole.

Preparation of 2-(2'-oxazolin-2'-yl)-benzimidazoles is illustrated in the following non-limitative practical example:

Example 2-(-2'oxazolin-2'-yl)-benzimidazole was prepared as follows: Ethanolamine was added to a hot solution of 2-monochlorodifluoromethylbenzimidazole in 1,2-dimethoxymethane. An immediate reaction occurred and solid was precipitated. The reaction mixture was allowed to cool to room temperature over 2 hours, then the solid was filtered off and washed with water giving 2-(2'oxazolin-2'-yl)-benzimidazole. Recrystallization from methanol gave colorless prisms, M.P. 268° C.

Yet another example of 2-azolin-2-yl-benzimidazoles which can be prepared utilizing the new compounds of the invention are the 2-(2'-thiazolin-2'-yl)-benzimidazoles having the structural formula:

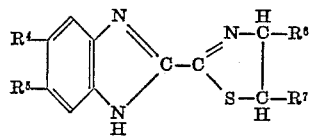

wherein $R_4$ and $R_5$ are selected from hydrogen, halogen, alkyl containing 1 to 6 carbon atoms, and alkoxy containing 1 to 6 carbon atoms; and $R^6$ and $R^7$ are selected from hydrogen and alkyl containing 1 to 6 carbon atoms. Illustrative of these compounds are 2-(2'-thiazolin-2'-yl)-benzimidazole; 2-(2'-thiazolin-2'-yl)-5,6-dimethylbenzimidazole; 2-(2'-thiazolin-2'-yl)-5-chlorobenzimidazole; 2-(2'-thiazolin-2'-yl)-5-methoxybenzimidazole; and 2-(4'-methyl-2'-thiazolin-2'-yl)-benzimidazole.

The 2-(2'-thiazolin-2'-yl)-benzimidazole compounds can be prepared by reacting a 2-trihalomethylbenzimidazole of the invention with a β-mercaptoalkylamine, as illustrated in the following equation:

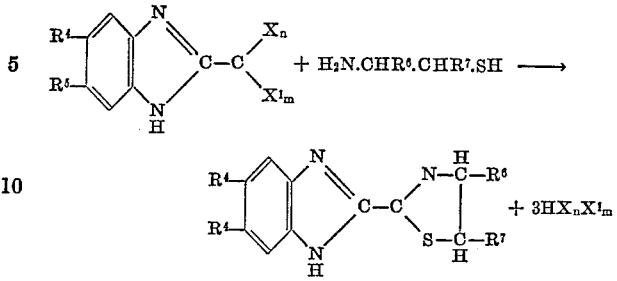

wherein $R^4$, $R^5$, $R^6$, $R^7$, X, $X^1$, n and m are as defined above. Thus, 2 - monochlorodifluoromethylbenzimidazole reacts spontaneously on mixing with an excess of β-mercaptoethylamine at room temperature to give 2-(2'-thiazolin-2'-yl)-benzimidazole in high yield. An inert diluent or solvent, such as 1,2-dimethoxyethane or ethyl acetate or an alcohol, may be used in carrying out the preparation of said compounds in order to give a more easily controlled reaction. The β-mercaptoethylamine may be conveniently used as the hydrochloride, the free base being generated in situ by the addition of a base such as a sodium alkoxide, or a tertiary amine. The order of mixing the reagents, or the molar proportion of the reagents, is not critical, however, an excess of the amine can be employed to neutralize the hydrogen chloride formed in the reaction. The reaction temperature is preferably held as low as possible in order to minimize the extent of side reactions. The reaction product is separated from solvent and amine hydrochloride by conventional means.

Preparation of 2-(2'-thiazolin-2'-yl)-benzimidazoles is illustrated in the following non-limitative practical examples:

Example 2-(2'-thiazolin-2'-yl)-benzimidazole was prepared as follows: 2-mercaptoethylamine hydrochloride was added to a solution of sodium in ethanol. 2-monochlorodifluoromethylbenzimidazole was added to this solution at room temperature when an exothermic reaction set in. The product was collected after 1 hour, washed with water, and recrystallized from ethanol to give 2-(2'thiazolin-2'-yl)-benzimidazole as plates, M.P. 292–294° C. (d).

Veterinary application of the specified compounds of the invention for the treatment of helminthiasis in animals can be carried out using anthelmintic preparations, for example, in the form of an aqueous suspension ready to use or in the form of a water-wettable or water-dispersible powder which is mixed with water prior to use as a drench; or in the form of suitably formulated tablets or capsules; or the specified compounds may be admixed with animal feedstuffs, as a dry powder or in granulated form. The anthelmintic preparations containing the specified compounds of the invention are preferably administered orally, as a liquid drench, or as a tablet or capsule, in unit dosage form, since this is generally considered to be the most effective manner of combatting helminthiasis. Alternatively, the specified compounds of the invention can be incorporated in urea or salt licks or blocks, so that the animals receive the anthelmintic material with the urea or salt.

In the field application of the compounds of the invention for the destruction of undesired vegetation and in the selective control or inhibition of plant growth, herbicidal effects can be obtained by the application of small amounts, e.g., one-half pound per acre, of the compounds, however, amounts as high as fifty pounds per acre may be necessary or desirable in some instances. For general application as a pre-emergence herbicide, amounts in the range of 0.5–25 pounds per acre of the compound can be used, greater selectivity being obtained at the lower concentration. Said compounds are most conveniently applied as herbicidal compositions containing from about 0.5% to about 95% by weight of the active compound. These herbicidal compositions or formulations can be prepared by admixing the active compound or a mixture of such compounds with an inert carrier or diluent material, the resultant compositions being ready for application to soil containing undesired post-emergent or pre-emergent vegetation, using conventional equipment for the purpose. Thus, the herbicidal compositions or formulations can be prepared in the form of solids or liquids.

The embodiments of the invention in which an exclusive property or privilege is claimed are defined as follows:

1. Compound of the formula

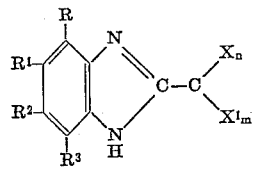

wherein R, R$^1$, and R$^2$ and R$^3$ are selected from the group consisting of hydrogen, halogen, OH, NO$_2$, NH$_2$, alkyl, alkoxy, haloalkyl of from 1 to 5 halogen atoms, alkylthio, alkylamino, dialkylamino, and alkanoylamino each of not more than 12 carbon atoms, X is chlorine, X$^1$ is fluorine, $n$ is an integer from 1 to 2, $m$ is an integer from 1 to 2 and the sum of $n+m$ is 3.

2. Compound to claim 1 wherein R and R$^3$ are hydrogen.

3. Compound to claim 1 wherein, R, R$^2$ and R$^3$ are hydrogen.

4. Compound according to claim 3 wherein R$^1$ is halogen.

5. Compound according to claim 3 wherein R$^1$ is alkyl.

6. Compound according to claim 3 wherein R$^1$ is alkoxy.

7. Compound according to claim 2 wherein R$^1$ and R$^2$ are alkyl.

8. Compound according to claim 1 selected from the group consisting of
2-monochlorodifluoromethylbenzimidazole;
2-monofluorodichloromethylbenzimidazole;
2-monochlorodifluoromethyl-5-methylbenzimidazole;
2-monofluorodichloromethyl-5-methylbenzimidazole;
2-monochlorodifluoromethyl-5,6-dimethylbenzimidazole;
2-monofluorodichloromethyl-5,6-dimethylbenzimidazole;
2-monochlorodifluoromethyl-5-methoxybenzimidazole;
2-monofluorodichloromethyl-5-chlorobenzimidazole;
2-monochlorodifluoromethyl-5-bromobenzimidazole;
2-monofluorodichloromethyl-5-bromobenzimidazole;
2-monochlorodifluoromethyl-5,6-dichlorobenzimidazole;
2-monofluorodichloromethyl-5,6-dichlorobenzimidazole;
2-monochlorodifluoromethyl-5-methylthiobenzimidazole;
2-monofluorodichloromethyl-5-methylthiobenzimidazole;
2-monochlorodifluoromethyl-5-chloromethylbenzimidazole;
2-monofluorodichloromethyl-5-chloromethylbenzimidazole;
2-monochlorodifluoromethyl-5-nitrobenzimidazole;
2-monofluorodichloromethyl-5-nitrobenzimidazole;
2-monochlorodifluoromethyl-5-aminobenzimidazole;
2-monofluorodichloromethyl-5-aminobenzimidazole;
2-monochlorodifluoromethyl-5-acetylaminobenzimidazole;
2-monofluorodichloromethyl-5-acetylaminobenzimidazole;
2-monochlorodifluoromethyl-5-methylaminobenzimidazole;
2-monofluorodichloromethyl-5-methylaminobenzimidazole;
2-monochlorodifluoromethyl-5-dimethylaminobenzimidazole;
2-monofluorodichloromethyl-5-dimethylaminobenzimidazole and
2-monochlorodifluoromethyl-5-chlorobenzimidazole.

9. Compound of claim 1 wherein R, R$^1$, R$^2$ and R$^3$ are selected from the group consisting of alkyl, alkoxy, haloalkyl of from 1 to 5 halogen atoms, alkylthio, alkylamino, dialkylamino and alkanoylamino each of not more than 4 carbon atoms.

References Cited

FOREIGN PATENTS
659,384    8/1965    Belgium.

OTHER REFERENCES
Bishop et al.: Jour. Chem. Soc. (London) 1964, pages 3076–80 (1964).
Brooke et al.: Jour. Chem. Soc. (London) 1961, pages 802–7.
Fara et al.: Chem. Abst. vol. 61, col. 6225 (1964).
Lane: Jour. Chem. Soc. (London) 1955, pages 534–9.
Lane et al.: Jour. Chem. Soc. (London) 1956, pages 569–73.
Morgan: Jour. Chem. Soc. (London) 1961, pages 2344–5.
Netherlands Application I 6410413 March 3, 1965, 260–309.2, 13 pages.
Netherlands Application II 6414890 June 6, 1965, 260–309.2 11 pages + 1 page drawing.

HENRY R. JILES, *Primary Examiner*

NATALIE TROUJOF, *Assistant Examiner.*

U.S. Cl. X.R.

71—92; 260—306.7, 307, 999